United States Patent [19]

Tighe

[11] 3,806,304
[45] Apr. 23, 1974

[54] MOLD FOR BUILDING LARGE BOATS FROM FIBER GLASS REINFORCED PLASTIC AND THE LIKE

[75] Inventor: William R. Tighe, Costa Mesa, Calif.

[73] Assignee: Willard Boat Works, Costa Mesa, Calif.

[22] Filed: Feb. 10, 1972

[21] Appl. No.: 225,198

[52] U.S. Cl............. 425/470, 161/DIG. 4, 249/168, 425/61, 425/185
[51] Int. Cl.............................................. B29c 1/16
[58] Field of Search................... 425/470, 61, 185; 161/DIG. 4; 249/168, 169

[56] References Cited
UNITED STATES PATENTS

| 1,460,676 | 7/1923 | Larsen | 425/61 |
| 1,345,013 | 6/1920 | Kastengren | 425/61 |
| 1,383,118 | 6/1921 | Holmgreen | 425/61 |
| 3,072,929 | 1/1963 | Skoggard | 161/DIG. 4 X |

Primary Examiner—Robert L. Spicer, Jr.
Attorney, Agent, or Firm—Auzville Jackson, Jr.

[57] ABSTRACT

The disclosure is directed to the manufacture of large boats from fiber glass reinforced plastic using a multi-section mold having drop-out sections which accommodate blocking and shoring members for the completed boat hull to enable separation of the remainder of the mold from the hull.

4 Claims, 7 Drawing Figures

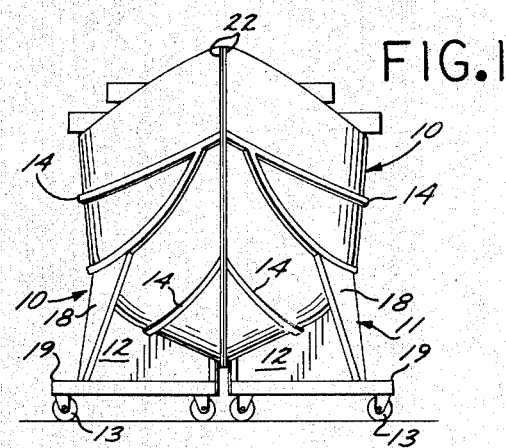
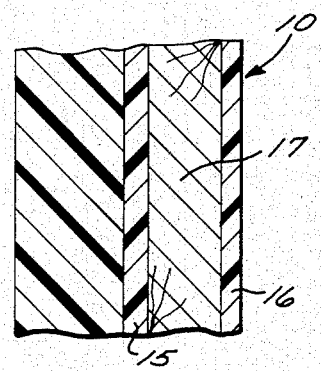
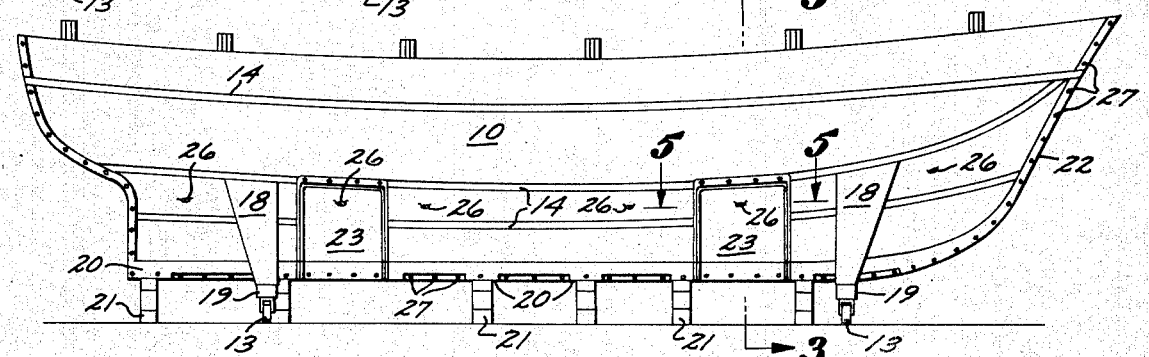
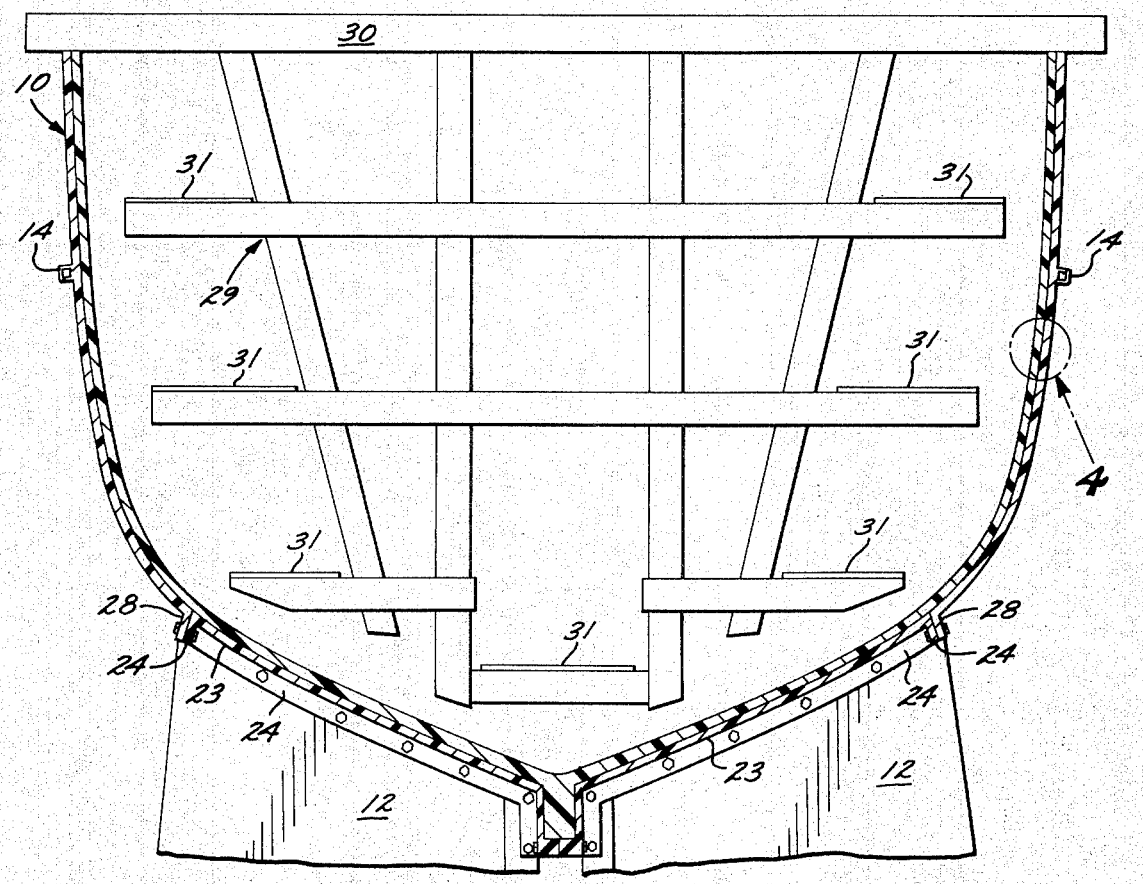

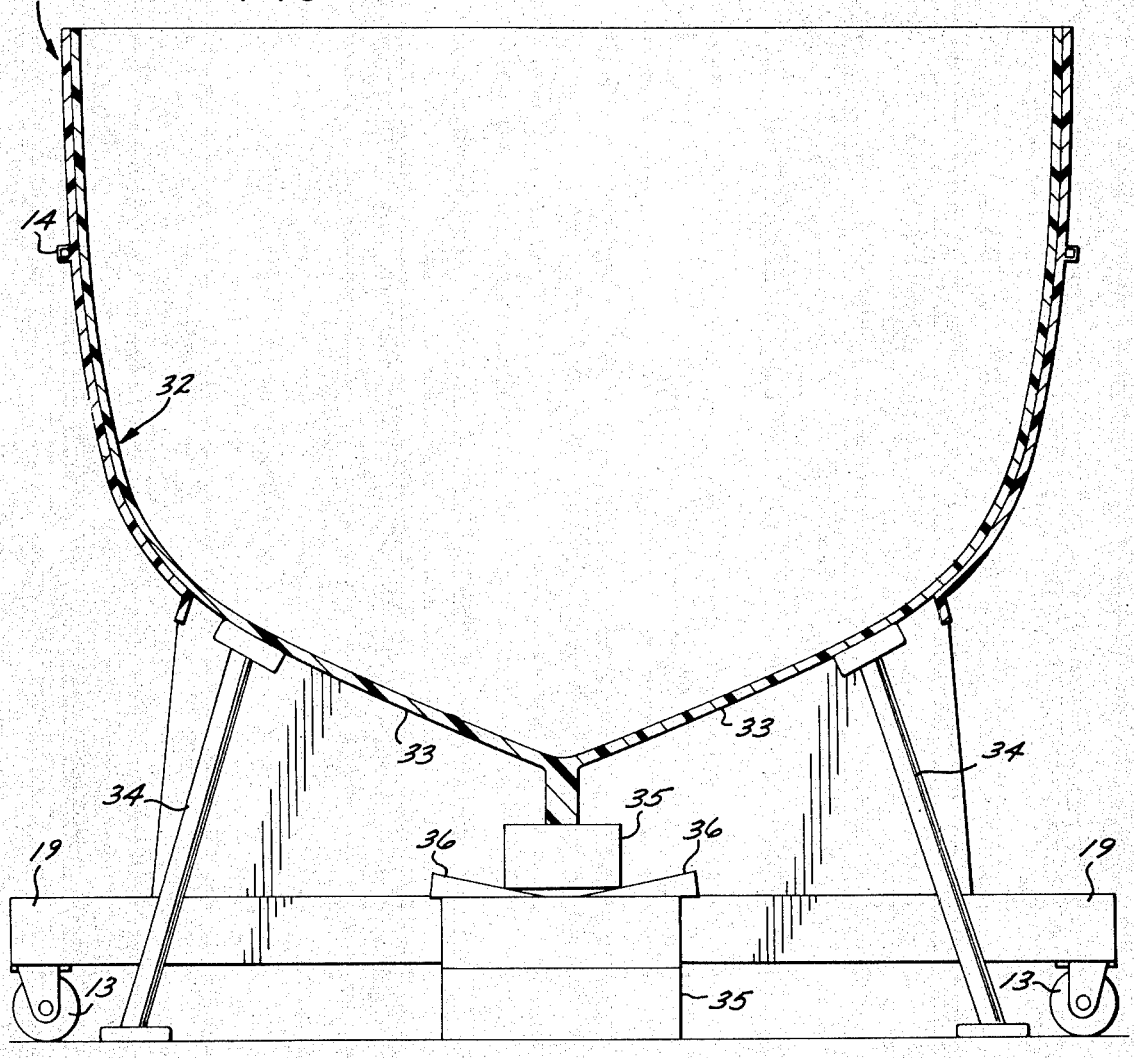

MOLD FOR BUILDING LARGE BOATS FROM FIBER GLASS REINFORCED PLASTIC AND THE LIKE

BACKGROUND OF THE INVENTION

The present invention relates to a method of making large boat hulls and the like from fiber glass reinforced plastic material in a manner that permits ready separation of the mold from the boat hull molded therein. The mold is a female mold divided so that it may be separated from the hull and moved sideways for removal from the hull after the hull has been cured. In order for this to be done, drop-out sections are provided which are small sections that permit blocking and shoring members to be located to retain the hull in an upright, stable position as the remainder of the mold is separated and moved away from the hull.

At the present time fiber glass reinforced plastic boats have become widely accepted in the smaller sizes but such boats are produced in fewer quantity and with increasing degree of difficulty as they grow in size. One of the foremost of these problems is the molding and handling of the single monolithic molded hull structure in an economical and practical manner. The reason for this is that the hull structure is the heaviest single one-piece member of the boat and the one that requires the greatest structural integrity.

At the present time most fiber glass reinforced plastic boats are made by a manufacturing process wherein a female mold with a highly polished interior of one-piece construction is utilized to mold the hull. Upon this mold is sprayed a gel coating using a technique similar to spray painting. The gel coating, which is usually a polyester resin, conforms exactly to the configuration of the mold. Next, the inside surface of the gel coat is overlaid by multiple layers of fiber glass impregnated with a polyester resin to the desired thickness. These multiple layers can be placed onto the surface by hand, followed by rolling and spreading into place the polyester resin or by the use of a "chopper" gun which feeds and cuts glass fiber strands into predetermined lengths and then propels the chopped strands, together with an appropriate quantity of polyester resin, onto the inside surface of the boat hull being formed. Even in the case of the use of a "chopper" gun technique, normally a hand layup is used in part. At the same time, some pull fixtures are embedded into the hull so as to provide attachment points for an overhead crane to lift the hull from the mold.

After the hull is cured, the overhead lifting device is attached to the pull points and the weight of the hull is taken up by the overhead lifting device, after which the mold is broken away by air pressure, water pressure, wedging techniques or other techniques if it does not come loose of its own free will. The lift is sufficiently high to completely clear the mold and the hull is either moved to a new location or the mold is removed from beneath it.

In the case of a divided mold, the overhead lifting device lifts just high enough to permit the mold to be divided and moved sideways away from the finished hull which is now held in the air by the overhead lifting device. The mold must then be transferred in the usual method of building to a cradle or some other supporting means to be held during the remainder of the finishing operation of placing an interior in the boat, a deck on the top and the like. Obviously, utilizing such procedure as in the case of the majority of the glass fiber reinforced plastic boats currently being manufactured requires the expense of overhead handling equipment and space accommodation in the building or mold room to accommodate the lifting equipment, plus the height of withdrawal of the hull mold. With large boat hulls, the space and load requirements for the handling equipment become a critical economic and technological factor in the making of such hulls. Still further, such overhead lifting equipment in the case of the use of monorails or track equipment usually has the inflexibility of requiring mounting in one location and thus does not permit its movement.

After the hull has been separated and placed on a cradle or some other supporting means, it is then completed by the insertion of various interior arrangements and the like and covered over with a deck. The completed boat is then ready for launching.

While there are other boat building techniques utilized in the building of fiber glass reinforced hulls from female molds, the above represents that general technique mostly utilized which works in a satisfactory manner for the small boats but cannot be readily and economically adopted for the low volume serial production of large, heavy boat hulls.

SUMMARY OF THE INVENTION

In accordance with the present invention a sectional female mold is utilized that has a minimum of two major sections and two drop-out sections. The two drop-out sections are removed from the hull after it is cured, and shoring and blocking members are placed under and on the side of the exposed hull to carry and support its weight free from the major mold sections which are still in place. Then, the major mold sections are unfastened from one another and separated from the new hull a sufficient distance that the new hull can be moved horizontally from between them. The major mold sections and drop-out sections are locked together during the manufacture of the boat hull. No crane or other mechanical assistance is used to lift the hull from the mold as an essential requirement although such may be utilized if available, the major lifting of the hull weight being done by a blocking and wedging action together with shores for stabilizers.

This new boat building method and the mold used in connection therewith permits an economical and practical method and mold for the manufacture of very large fiber glass reinforced boat hulls of one-piece construction. By very large boat hull is meant, as in the example illustrated in the present application, an 82-foot long hull weighing 29,000 pounds. For purposes of this application, it is believed that boat hulls 50 feet and larger would be considered large boat hulls for fiber glass reinforced plastic construction. It is contemplated at the present time that a yacht hull 110 feet or longer, which would be the largest fiber glass yacht in the world, can be made using this method.

Still further, the drop-out sections which span the keel of the hull and are located at the edge of major mold sections, bridging from one major mold section to another major mold section in either one or two pieces, can be omitted during the manufacture of the fiber glass reinforced hull except for the last stages and used as openings for the passage of men and material used in building the hull. It can be readily appreciated that in the absence of these low openings men and material would have to climb the full height of the mold, go over the top and climb down into the bottom of the mold to work therein. Still further, the accumulation of fumes associated with the building of fiber glass reinforced plastic boats could readily overcome the workmen and would certainly be uncomfortable. These fumes are readily trapped in the bottom of a large cavity as is formed by female hull molds. This is obviated by placing a large fan adopted in a box-like structure to be rolled up into one of the drop-out sections to readily ventilate and move fresh air into the hull mold for the comfort of the workmen.

When such openings are utilized the fiber glass is applied in a manner that it is tapered away from the openings using standard engineering guidelines until the thickness of the hull is achieved everywhere except in the vicinity of the drop-out sections. Then the workmen can close the drop-out sections and lay up the relatively small areas to the proper thickness in the areas of the drop-out sections until those areas are the same thickness as the remainder of the hull and are properly feathered into the remainder so that when cured a single one-piece monolithic hull with high structural integrity is provided.

Many other advantages of the present invention will become apparent from the following description taken in connection with the accompanying drawings.

BRIEF DESCRIPTION OF THE DRAWINGS

FIG. 1 is a front view of the hull mold of this invention.

FIG. 2 is a side view of the hull mold of this invention.

FIG. 3 is a transverse sectional view taken on Section 3—3 of FIG. 2.

FIG. 4 is a partial sectional view of the hull mold with the hull laid up therein taken from portion "4" of FIG. 3.

FIG. 5 is a sectional view taken on Section 5—5 of FIG. 2 showing some details of the drop-out section.

FIG. 6 is a side view similar to FIG. 2 where the drop-out sections have been removed and the exposed hull blocked and shored.

FIG. 7 is a transverse sectional view taken on Section 7—7 of FIG. 6 and shows more clearly the blocking and shoring arrangement.

DESCRIPTION OF THE INVENTION

In practicing this invention, the first thing is to provide a plug or a full-scale model of the hull which is to be reproduced. This is in an inverted fashion and the mold is made therefrom by first applying a hard polyester gel coat to the plug which has previously been waxed or otherwise treated to prevent the gel coat from sticking thereto. Then, in the case of one embodiment of the present invention, a first fiber glass layer is laid on top of the gel coat to a thickness of approximately three-eighths inch, using well-known techniques for hand lay-up of fiber glass reinforced polyester laminates. To this is applied a 1-inch layer of end grain balsa wood and over this, additional glass reinforced polyester is laminated to a thickness of one-fourth inch, giving a total thickness of approximately 1 5/8 inches. A section of the major mold section 10 is shown in FIG. 4 with the mold inner layer 15 being spaced from mold outer layer 16 by mold balsa layer 17. At the same time, and before the mold is finished, stiffening ribs 14 which are made from hollow rigid hat sections covered over with glass reinforced polyester resin extend from bow to stern at three separate locations on each half section of the mold 10. Affixed to each half section of the mold are two support legs 11 composed of transverse leg supporting webs 12 and longitudinal leg supporting webs 18 both of which rest on wheel beam 19 which carries two sets of wheels 13.

This construction of two glass reinforced plastic layers spaced apart by an integral light weight balsa core together with the longitudinal stiffening ribs and web supported legs permit each of the two major mold sections of the massive size of 82 feet in length and approximately 12 feet wide and 28 feet high with a weight of approximately 11,000 pounds to be moved on only four wheels without all of the numerous stiffeners which would otherwise have had to be utilized.

After the mold has been laid up on the plug, it is separated and turned right side up to a position to rest on its wheels.

Extending around the entire longitudinal periphery of each of the major mold sections is a flange 22 with holes therein on 1½ to 2 foot centers mating with the other half section of the mold through which bolts 27 are applied and tightened to hold the two halves in place.

Each major mold section has at its edge two drop-out sections 23 of approximately 6 feet by 8 feet which are held in position by peripheral flanges 24 (FIGS. 3 and 5) with bolt holes therethrough that are complimented by mating flanges 22 on the major mold sections. Both the major mold sections and, if desired, the drop-out sections have water or air insert fittings 26 which may be utilized to help break a hull from the mold.

As an actual example of building one hull in accordance with the teachings of this invention, which hull is 82 feet long, 21 feet-one inch in beam, weights approximately 29,000 pounds, has a surface area of approximately 2,920 square feet and a height of approximately 21 feet, the following method was utilized.

First, the two major mold sections were bolted together and then blocks 21 were located underneath the blocking points 20 and wedges applied to take the weight of the mold and later the weight of the mold with the hull therein. The blocking points 20 along the keel are thicker than the adjacent portion of the mold.

Next, if shoring is needed to stabilize the mold from falling over, it is applied at this time. Scaffolding 29 is then assembled to hang from beams 30 extending across the gunwales as shown in FIG. 3. The scaffolding is held together with bolts and can be assembled and disassembled as needed. It is noted that it suspends only from the beams across the gunwales and does not touch the interior of the mold but is suspended far enough away to permit workmen to use scaffold walkway 31 and work on the surface of the mold in laying up the laminate. While the drop-out sections could be put into position as fastened at this time, for reasons that will become apparent, it is preferred that they be omitted at this stage of the production.

Next, removable sections (not shown) to define windows and guardrail receiver recess are applied to the interior of the mold and likewise breakaway foamed polystyrene handholds are placed at suitable locations on the inside of the mold, together with any other items desired in the finished hull, such as a boarding rail gate.

A suitable wax or other non-stick layer is then applied to the inner surface of the mold so that later the hull can be separated therefrom. While just a highly waxed mold will sometimes provide a sufficient surface to prevent the laminate from sticking, in the present instance a water soluble parting agent was utilized. Following the addition of the parting agent, a large fan (not shown) adapted to fit into one of the drop-out sections is rolled into place and is utilized during the manufacture of the hull to ventilate the interior thereof. Otherwise the workmen would find it extremely difficult to carry out their duties. Another of the drop-out sections is utilized for ingress and egress for both workmen and materials. Because of the huge quantities of materials involved in manufacturing large hulls of the kind contemplated by this invention, materials handling and the movement of the workers is a substantial problem. If workers had to climb over the gunwales of the mold every time they entered and left to carry either materials or themselves, the amount of labor and so forth would be substantially increased. By using the opening at the bottom where a drop-out section has been left out, the material handling and worker movement is greatly improved.

A white gel coat 15 mils thick is applied over the parting agent and after this has dried a black gel coat backup 5 mils thick is applied thereover. Twelve passes are then made to build the hull as follows, using standard hand lay-up techniques and a polyester laminating resin:

Pass No. 1 = 1 oz mat + 10 oz. cloth
Pass No. 2 = 2 oz " + 24 oz. roving
Pass No. 3 = " " + " "
Pass No. 4 = " " + " "
Pass No. 5 = " " + " "
Pass No. 6 = " " + " "
Pass No. 7 = " " + " "
Pass No. 8 = " " + " " (turn of bilge)
Pass No. 9 = " " + " " ( " " " )
Pass No. 10 = " " + " " (bottom to keel)
Pass No. 11 = " " + " " (bottom to keel)
Pass No. 12 = " " + " " (keel)

The passes overlapped at the bow, keel and stern centerline to maximize strength.

The finished hull is approximately 1½ to 2 inches thick and as it is being laid up is gradually tapered away from the drop-out section position in an approved and well known manner so that when additional laminate is added to these areas, it will form a monolithic hull without weak spots in the areas that are added as last steps.

Then, near the last in laminating the hull, the drop-out sections 23 are bolted into place. In the areas defined by the drop-out sections, parting agents, gel coats and hand layups are applied to marry in a tapered manner with the rest of the hull which had been previously laid up so that when it is finally cured and completed, the hull is one single monolithic section without any structural weakness in the areas of the drop-out sections.

The scaffolding is removed from the interior, as seen in FIGS. 6 and 7. The drop-out sections are unbolted from the major mold half sections and are removed, together with their spacer, to create an exposed portion 33 of the completed hull 32 running from one side underneath clear around to an opposite side, to a sufficient extent that shoring 34 can be applied directly to the hull surface to prevent it from falling over, and hull blocks 35 applied under the keel. If the drop-out sections do not readily come loose from the hull, this may be assisted by water or air being applied through fittings 26. After the blocks are applied, wedges 36 are used to wedge upward and the shores are continuously wedged inward until the entire weight of the hull 32 and possibly the mold if it is still adhered to the hull is carried by the blocks 35 and shoring 34 applied directly to the hull at the portions exposed through removal of the drop-out sections. There is practically no discernible upward movement during the wedging (in the order of one-eighth of an inch) but this does carry the weight to permit later removal of the major mold sections.

All of the short bolts 27 are unfastened from the peripheral flange of the major mold sections and as this is done bolts approximately 1 foot long are substituted therefor and loosely held with a nut. This is a safety precaution so that when the major mold sections are broken away from the hull, if there was a sudden release of force, the heavy major mold sections would not fall over and injure either themselves or people or objects around them.

Next, the blocks are removed from underneath the major mold sections and water is permitted to be filled up from the gunwale portion between the mold and hull and left to drain out overnight. This serves to help dissolve the water soluble parting agent and permit more ready removal of the hull and mold from each other the next day.

Wedges are then applied to the gunwale level between the hull mold to force them apart. If necessary, water or air can be applied to the fittings 26 provided for this purpose but such is not always necessary. After the major mold sections have been separated from the finished hull, the long safety bolts are removed and the two major mold sections moved transversely away from the hull a distance sufficient to remove the hull from therebetween. Thus, there is no vertical lifting of the hull whatsoever other than for the slight amount to take the load at the time of the separation of the hull from the mold which is one of the most difficult of operations in building large fiber glass reinforced plastic molded boats.

The hull is then either moved or left in place as the remainder of the boat is built.

While the invention has been pointed out in connection with building one specific hull, it is obvious that numerous modifications can be made in the procedures and that it could be applied to other materials similar to fiber glass reinforced polyester in keeping with the spirit of the invention. It could likewise be applied to other large objects of the shape of boat hulls, that is, large concave molds, where the procedure would lend itself for such application.

The invention is of primary value in the role of serial production of large structures and as contemplated will permit even larger fiber glass reinforced plastic boats and the like to be built.

While the mold is shown with two major mold sections and four drop-out sections, and such number are preferred, it could have been made and possibly will in the case of larger vessels with more mold sections and drop-out sections. However, the drop-out sections will have to extend under the keel line and up both sides sufficient to permit blocking and shoring to take the entire weight of the hull and permit the major mold sections to be moved in primarily a horizontal direction away from the finished hull a sufficient distance to permit the hull to be moved from therebetween. Thus the drop-out sections when removed must bridge or expose the area between two major mold sections in order to permit the major mold sections to be separated.

The above invention may be embodied in other numerous procedures and forms without departing from the spirit or essential characteristics of the invention herein. The present disclosure is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A female mold concaved upward for building a large fiber glass reinforced plastic boat hull and the like comprising:

Two or more movable major mold sections temporarily fastened together and mounted for horizontal movement on a horizontal and substantially flat surface;

Two or more movable drop-out sections, said drop-out sections being located at the edge of said major mold sections at the bottom of the mold and serving to be completely surrounded by the major mold sections;

Means fastening said drop-out sections to the major mold sections in a temporary manner so that they may be removed or fastened in position to expose or close an opening at the bottommost portion of said mold while the surrounding major mold sections are still fastened together; and Means temporarily fastening said major mold sections together.

2. The mold of claim 1 wherein the molding surfaces of said mold are highly polished and adapted for releasably having a polyester gel coat applied thereto.

3. The mold of claim 2 where each of said major mold sections is mounted on stiffened legs which are capable of independently supporting said major mold section during horizontal movement to and away from a boat hull and the like which has been molded therein.

4. The mold of claim 1 wherein the molding surfaces of said major mold sections and said drop-out sections are highly polished and adapted for releasably having a glass fiber reinforced plastic laminated boat hull built thereupon and wherein said temporary fastening means between said drop-out sections and their surrounding major mold sections and between adjacent major mold sections include closely mating turned out flanges at the contiguous edges of said sections and mechanical means for pulling said flanges together.

* * * * *